(12) United States Patent
Friend (10) Patent No.: US 11,454,713 B2
(45) Date of Patent: Sep. 27, 2022

(54) CONFIGURATION OF A LIDAR SENSOR SCAN AREA ACCORDING TO A CYCLE SEGMENT OF AN OPERATION OF A MACHINE

(71) Applicant: Caterpillar Inc., Peoria, IL (US)

(72) Inventor: Paul Russell Friend, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 415 days.

(21) Appl. No.: 16/781,759

(22) Filed: Feb. 4, 2020

(65) Prior Publication Data
US 2021/0239808 A1    Aug. 5, 2021

(51) Int. Cl.
| | | |
|---|---|---|
| *G01S 17/00* | (2020.01) | |
| *G01S 7/497* | (2006.01) | |
| *G01S 17/42* | (2006.01) | |
| *G07C 5/08* | (2006.01) | |
| *E02F 9/26* | (2006.01) | |
| *E02F 9/20* | (2006.01) | |
| *E02F 3/43* | (2006.01) | |

(52) U.S. Cl.
CPC .............. *G01S 7/497* (2013.01); *E02F 9/205* (2013.01); *E02F 9/2041* (2013.01); *E02F 9/262* (2013.01); *E02F 9/265* (2013.01); *E02F 9/267* (2013.01); *G01S 17/42* (2013.01); *G07C 5/0816* (2013.01); *E02F 3/439* (2013.01)

(58) Field of Classification Search
None
See application file for complete search history.

(56) References Cited

U.S. PATENT DOCUMENTS

| | | | |
|---|---|---|---|
| 9,880,075 B2 * | 1/2018 | Finch ................. | G01N 21/8851 |
| 10,339,667 B2 * | 7/2019 | Tafazoli Bilandi .. | G06V 10/751 |
| 10,504,072 B2 * | 12/2019 | Restum ................. | E02F 3/142 |
| 10,684,137 B2 * | 6/2020 | Kean ..................... | G06V 20/13 |
| 11,138,718 B2 * | 10/2021 | Campomanes ......... | G06T 17/00 |
| 2015/0149049 A1 * | 5/2015 | Bewley .................. | E02F 9/267 37/444 |
| 2016/0237640 A1 * | 8/2016 | Carpenter ............ | E02F 9/2833 |
| 2017/0067229 A1 * | 3/2017 | Stock ..................... | E02F 9/2866 |
| 2017/0329304 A1 * | 11/2017 | Aremu ................. | G05D 1/0297 |
| 2018/0349863 A1 * | 12/2018 | Restum ................. | G06Q 10/20 |
| 2020/0041649 A1 * | 2/2020 | Green ................... | G01S 7/4808 |
| 2021/0004744 A1 * | 1/2021 | Petrany ............ | G06Q 10/06313 |

(Continued)

FOREIGN PATENT DOCUMENTS

| | | |
|---|---|---|
| CN | 104018545 A | 9/2014 |
| CN | 106592679 A | 4/2017 |

*Primary Examiner* — Jonathan M Dager
(74) *Attorney, Agent, or Firm* — Harrity & Harrity LLP (57) ABSTRACT

A light detection and ranging (LIDAR) controller is disclosed. The LIDAR controller may receive cycle segment information identifying a cycle segment of an operation of a machine. The LIDAR controller may determine, based on the cycle segment information, a scan area within a field of view of the LIDAR sensor. The LIDAR controller may cause the LIDAR sensor to capture, with an increased point density relative to a non-scan area within the field of view, LIDAR data associated with the scan area. The LIDAR controller may process the LIDAR data to determine, using the increased point density, a status associated with the operation. The LIDAR controller may perform an action associated with indicating the status associated with the operation.

20 Claims, 7 Drawing Sheets

(56) References Cited

U.S. PATENT DOCUMENTS

| | | |
|---|---|---|
| 2021/0148089 A1* | 5/2021 | Lee .......................... G01S 17/42 |
| 2021/0254308 A1* | 8/2021 | Thibblin ................ G01S 17/931 |
| 2021/0301493 A1* | 9/2021 | Abd El Salam Mohamed ........... G05D 1/0088 |
| 2022/0034071 A1* | 2/2022 | Zhao ..................... E02F 9/2041 |

* cited by examiner

CONFIGURATION OF A LIDAR SENSOR SCAN AREA ACCORDING TO A CYCLE SEGMENT OF AN OPERATION OF A MACHINE

TECHNICAL FIELD

The present disclosure relates generally to configuration of a LIDAR sensor and, for example, to configuration of a LIDAR sensor scan area according to a cycle segment of an operation of an operation of a machine.

BACKGROUND

Machines, for example excavators, loaders, dozers, and/or the like, are commonly used in material moving applications. These machines include an implement (or work tool) having a ground engaging tool configured to contact the material. For example, an excavator may include a bucket that has a plurality of wear elements (e.g., teeth) to penetrate, dig, displace, and/or transfer material, such as ground material (e.g., rock, soil, and/or the like) at a worksite. Ground engaging tools, during an operation of a machine, are to engage with the ground material so as to displace, distribute, or level the material. During an operation, the material may abrade ground engaging tools of a machine (or of an implement of a machine), causing the ground engaging tools to erode and/or break away from the machine. Accordingly, the ground engaging tool may be removably attached to the work tool and/or replaced on a periodic basis or when unexpectedly removed during an operation.

Light detection and ranging (LIDAR) can be used in various applications, such as generating high-resolution maps, controlling autonomous vehicles, analyzing objects, and/or the like. For example, a LIDAR sensor, mounted in fixed and/or variable positions, can detect, analyze, and/or measure a distance to a target by illuminating the target with pulsed laser light and analyzing reflected pulses. The LIDAR sensor provides LIDAR data that is based on differences in pulse transmission and return times (e.g., time of flight) and/or differences in pulse wavelengths associated with the points of the target. Such LIDAR data can be used to determine representations of the target, features of the target, and/or distances to features of the target.

A LIDAR sensor has a limited set of points for a scan. Accordingly, for a LIDAR sensor that has a fixed field of view (e.g., a LIDAR sensor that is not mounted to an independently controllable mechanical mounting mechanism), obstructions and/or positioning of the LIDAR sensor relative to a target may reduce a level of accuracy associated with detecting and/or analyzing a target (e.g., a ground engaging tool of a machine), even when the target is within the field of view of the LIDAR sensor.

A warning device and system disclosed in China Patent No. CN106592679A, dated Apr. 26, 2017, ("the '679 reference") includes a three-dimensional laser sensor and a position sensor. In the '679 reference, the position of the bucket is obtained through the position sensor, whether the bucket is in a preset range is determined, and image information of the bucket is subjected to image scanning by the three-dimensional laser sensor only when the bucket is in the preset range. Further, in the '679 reference, an alarm signal is given out when the situation of a missing bucket tooth occurs.

While the warning device and system of the '679 reference monitors the bucket in real time, the warning device and system controls the laser scanning only when the bucket is within the preset range to avoid long-term continuous scanning, prolong a service life of equipment, avoid collection of invalid information, and improve efficiency of point cloud processing.

The LIDAR controller of the present disclosure solves one or more of the problems set forth above and/or other problems in the art.

SUMMARY

According to some implementations, a method may include receiving an input associated with an operation of a machine; determining, based on the input, a cycle segment of the operation; determining, based on the cycle segment, a scan area within a field of view of a light detection and ranging (LIDAR) sensor mounted to the machine, wherein the scan area has an increased point density relative to another area of the field of view; causing the LIDAR sensor to capture, with the increased point density, LIDAR data associated with the scan area; processing the LIDAR data to determine, using the increased point density, a status associated with the operation; and performing an action associated with indicating the status associated with the operation.

According to some implementations, a device may include one or more memories; and one or more processors, communicatively coupled to the one or more memories, configured to: determine, based on operating parameters of a machine, a cycle segment of an operation of the machine; determine, based on the cycle segment, a scan area within a field of view of a LIDAR sensor associated with the machine, wherein the scan area has an increased point density relative to another area of the field of view; cause the LIDAR sensor to capture, with the increased point density, LIDAR data associated with the scan area; process the LIDAR data to determine, using the increased point density and an object detection model, a status associated with the operation; and perform an action associated with indicating the status associated with the operation.

According to some implementations, a system may include a LIDAR sensor and a controller configured to: receive cycle segment information identifying a cycle segment of an operation of a machine; determine, based on the cycle segment information, a scan area within a field of view of the LIDAR sensor; cause the LIDAR sensor to capture, with an increased point density relative to a non-scan area within the field of view, LIDAR data associated with the scan area; process the LIDAR data to determine, using the increased point density, a status associated with the operation; and perform an action associated with indicating the status associated with the operation.

DETAILED DESCRIPTION

This disclosure relates to a light detection and ranging (LIDAR) controller for a LIDAR sensor associated with and/or mounted to a machine. The LIDAR controller has universal applicability to any machine utilizing a LIDAR sensor to monitor the machine and/or an operation of the machine. The term "machine" may refer to any machine that performs an operation associated with an industry such as, for example, mining, construction, farming, transportation, or any other industry. As some examples, the machine may be an excavator, a backhoe loader, a dozer, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a vehicle, a tractor scraper, or other above ground equipment, underground equipment, or marine equipment.

Figure 1:
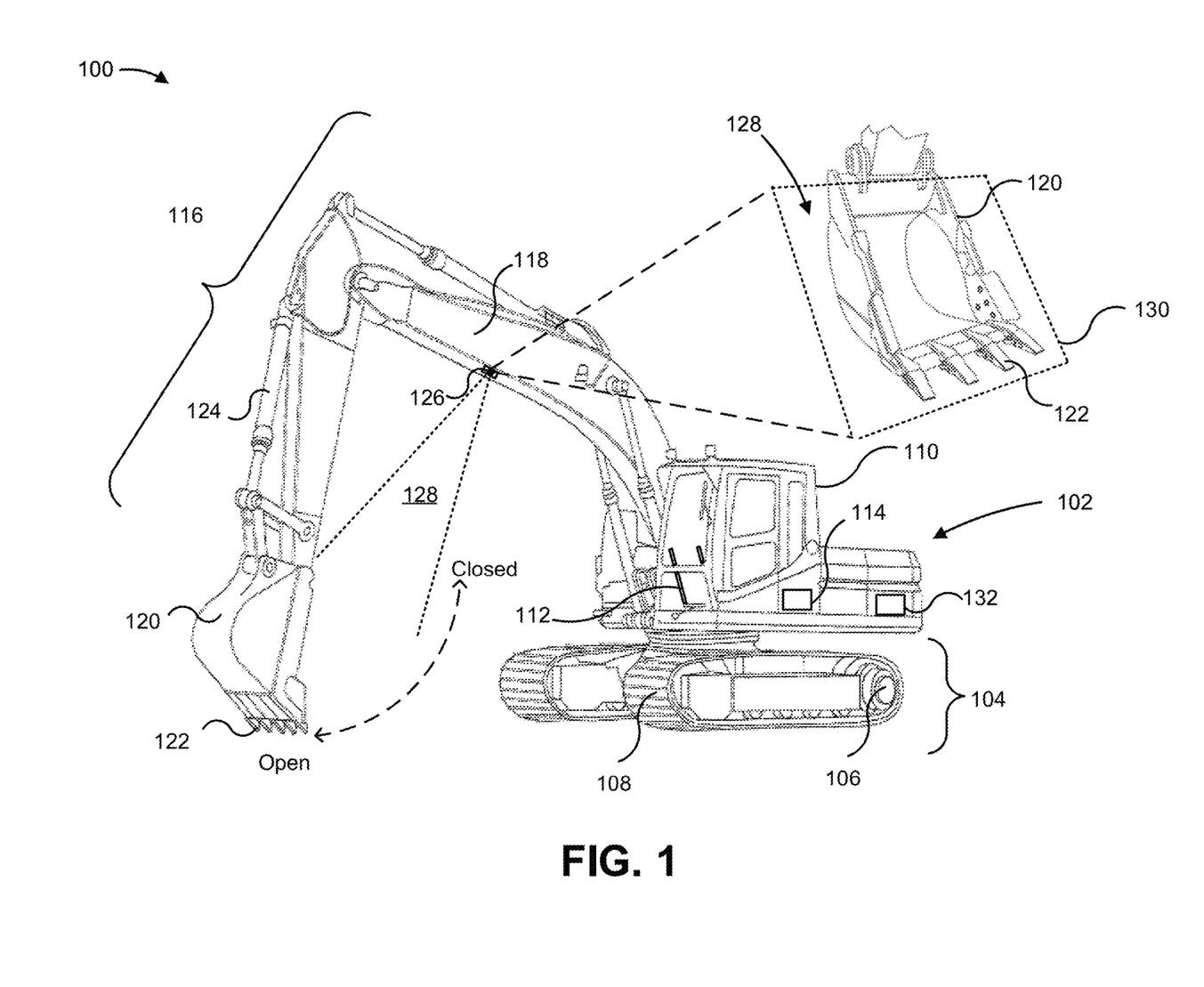
FIG. 1 is diagram of an example machine described herein.

FIG. 1 is diagram of an example machine 100 described herein. The machine 100 is shown in FIG. 1 as an excavator but may include any type of machine that may utilize a LIDAR sensor and/or LIDAR controller as described herein. Accordingly, the machine 100, as described herein, may perform an operation (e.g., at a worksite) associated with penetrating, digging, displaying, transporting, and/or dumping material (e.g., "material" may refer to ground material at a worksite).

As shown, the machine 100 may have a body 102 and a support structure 104 that includes a drive system 106 and traction system 108. The body 102 may be rotatable relative to the support structure 104. Accordingly, as described herein, during or between certain cycle segments of an operation of the machine 100, the body 102 may rotate relative to the support structure 104 (e.g., to displace or transport ground material during the operation).

As shown, the body 102 includes an operator station 110 including an operator interface 112 that can be used to operate the machine 100. For example, the operator interface 112 may include one or more input devices (e.g., buttons, keypads, touchscreens, trackballs, joy sticks, levers, pedals, steering mechanisms, and/or the like) and/or output devices (e.g., displays, illumination indicators, speakers, and/or the like). In some implementations, the operator station 110 and/or one or more components of the operator interface 112 may be remotely located (e.g., not onboard the machine 100). In such a case, the machine 100 may be remotely controlled, may remotely receive communications to perform operations (e.g., in association with autonomous control of the machine 100), and/or the like.

The machine 100 includes an electronic control module (ECM) 114 configured to control various operations of the machine 100. The ECM 114 may control the operation according to inputs from operator interface 112. In some implementations, the ECM 114 may be configured to autonomously control an operation of the machine. For example, the ECM 114 may process instructions associated with controlling various components of the machine 100 to perform an operation, as described herein.

The machine 100 also has a power source (e.g., an internal combustion engine, a generator, a battery, and/or the like) configured to supply power to the machine 100 and/or components of machine 100. The power source may be operably arranged to receive control signals from the operator interface 112 in the operator station 110. Additionally, the power source may be operably arranged with the drive system 106, an implement 116 coupled to the body 102, and/or one or more rotational members to selectively operate the drive system 106, to selectively operate the implement 116, and/or to selectively rotate the body 102 relative to the support structure 104 according to control signals (e.g., received from the operator interface 112). The power source may provide operating power for the propulsion of the drive system 106, the operation of the implement 116, and/or the rotation of the body 102 about a rotation axis.

The drive system 106 may be operably arranged with the power source to selectively propel the machine 100 via control signals from the operator interface 112. The drive system 106 may be operably connected to a plurality of ground-engaging members, such as traction system 108, as shown, which may be movably connected to the machine 100 and the body 102 through axles, drive shafts, a transmission, and/or other components and which may be movably connected to the power source and the drive system 106. The traction system 108 may be provided in the form of a track-drive system, a wheel-drive system, and/or any other type of drive system configured to propel the machine 100 forward and/or backward. For example, the traction system 108 may include a pair of tracks that can be independently operated in a forward or reverse direction in order to move the machine 100 forward, move the machine 100 backward, turn or otherwise change a travel direction, and/or the like. The drive system 106 may be operably arranged with the power source to selectively operate the implement 116, which may be movably connected to the machine 100, the body 102, and the drive system 106.

The implement 116 may be operably arranged with the drive system 106 such that the implement 116 is movable through control signals transmitted from the operator interface 112 to the drive system 106. The implement 116 illustrated in FIG. 1 includes a boom 118 mechanically coupled with a bucket 120 that includes a plurality of ground engaging tools (which may be referred to herein individually as a "bucket tooth 122" and collective as "bucket teeth 122"). A hydraulics system 124 of the implement 116 may be powered by the power source and controlled by the operator interface 112 to adjust a position of the boom 118 and/or the bucket 120. As shown by the dashed arrow, the bucket 120 may pivot about an end of the boom 118 between an open position and a closed position (e.g., to facilitate a digging operation, a holding operation, a dumping operation, and/or the like). Other implementations can include any other suitable implement for various tasks, such as, for example, dozing, blading, brushing, compacting, grading, lifting, ripping, plowing, and/or the like. Example implements include dozers, augers, buckets, breakers/hammers, brushes, compactors, cutters, forked lifting devices, grader bits and end bits, grapples, and/or the like.

According to some implementations described herein, the machine 100 includes a light detection and ranging (LIDAR) sensor 126 for monitoring one or more operations of the machine 100. As shown in FIG. 1, the LIDAR sensor 126 is mounted to the boom 118 to have a field of view 128 (shown within dotted lines) that is directed toward the bucket 120. In other implementations, the LIDAR sensor 126 may be mounted elsewhere on the boom 118 and/or on the body 102 or support structure 104 so that the LIDAR sensor 126 includes a different field of view that is directed toward the bucket 120.

The LIDAR sensor 126 may be fixed to the machine 100 (e.g., to the body 102, to the support structure 104, to the implement 116, and/or the like), such that a portion of the bucket 120 that is within the field of view 128, if any, depends on the orientation and/or position of the bucket 120.

For example, in a relatively closed position (e.g., after a dig operation) as shown in FIG. 1, the bucket 120 may be positioned within a perimeter 130 of the field of view 128. Accordingly, the LIDAR sensor 126 can capture LIDAR data associated with the bucket 120 to a characteristic of the bucket 120 to be determined (e.g., according to an object detection and/or object analysis model, as described herein). In contrast, in a partially or fully open position (e.g., before a dig operation or after a dump operation), the bucket 120 may not be visible within the perimeter 130 of the field of view 128. Accordingly, the LIDAR sensor may not be capable of capturing certain LIDAR data associated with the bucket 120, but may be used to capture LIDAR data associated with another operation of the machine 100 (e.g., LIDAR data associated with ground material at a digging site of the machine 100, ground material in a dump location of the machine 100, and/or the like). In this way, the field of view 128 of the LIDAR sensor 126 may depend on a position and/or orientation of the machine 100 and whether the bucket 120 is within the field of view 128 may depend on a position and/or orientation of the implement 116 (e.g., the position and/or orientation of the boom 118 and/or the bucket 120).

The machine 100 may include an operation sensor system 132 that includes one or more sensors to monitor operations of the machine 100. Such sensors may include a position sensor (e.g., a magnetometer, such as a Hall effect sensor, an anisotropic magnetoresistive (AMR) sensor, a giant magneto-resistive sensor (GMR), and/or the like), a location sensor (e.g., a global navigation satellite system (GNSS), including a global positioning system (GPS) receiver, a local positioning system (LPS) device (e.g., that uses triangulation, multi-lateration, etc.), and/or the like), an inertial sensor (e.g., an accelerometer and/or a gyroscope, such as an inertial micro-electro-mechanical systems (MEMS) device, a fiber optic gyroscope (FOG), or a similar type of device), a ranging radio, a perception based localization sensor (e.g., that uses radio detection and ranging (RADAR), LIDAR, a stereo camera, a mono camera, and/or the like), a speed sensor, a motion sensor, an infrared sensor, a temperature sensor, a pressure sensor, and/or the like. The operation sensor system 132 may include physical sensors and/or any appropriate type of measurement system that generates measurements for values of operating parameters of the machine 100 based on a computational model and/or one or more measured values. The operation sensor system 132 may provide measurements associated with various operating parameters used by the ECM 114 to identify, monitor, and/or control operations of the machine 100.

The operation sensor system 132 may be configured to coincide with the ECM 114, may be configured as a separate control system, and/or may be configured as a part of other control systems. Further, the ECM 114 may implement the operation sensor system 132 by using computer software, hardware, or a combination of software and hardware. For example, the ECM 114 may execute instructions to cause sensors of the operation sensor system 132 to sense and/or generate operating values for parameters of the machine 100.

The LIDAR sensor 126 may enable the ECM 114 (and/or an operator via operator interface 112) to monitor an operation of the machine 100 by providing LIDAR data associated with objects within the field of view 128. For example, the ECM 114, based on a cycle segment of an operation of the machine 100 (which may be determined from inputs of the operator interface or measurements of the operation sensor system 132), may be configured to determine a scan area associated with an object of interest, cause the LIDAR sensor 126 to capture LIDAR data from the scan area with an increased point density of the LIDAR sensor 126 relative to other portions of the field of view 128 (e.g., to improve an accuracy of detecting and/or analyzing the object), and analyze any objects depicted and/or associated with the LIDAR data using the increased point density.

Accordingly, with relatively increased accuracy over previous techniques, the ECM 114 may be able to determine a characteristic of the bucket 120 (e.g., a wear status of one or more of the bucket teeth 122), a characteristic of a worksite of the machine 100 (e.g., an amount of ground material at a dig site, an amount of ground material within the bucket 120 after a dig, an amount of ground material in a dump location of the worksite, an amount of available space for ground material at the dump location, an obstruction associated with a travel operation and/or dig operation, and/or the like). The ECM 114 may provide information identifying the characteristic to the operator interface 112 and/or to a remotely located device (e.g., a backend monitoring system communicatively coupled with the machine 100 and/or ECM 114).

As indicated above, FIG. 1 is provided as an example. Other examples may differ from what was described in connection with FIG. 1.

Figure 2:
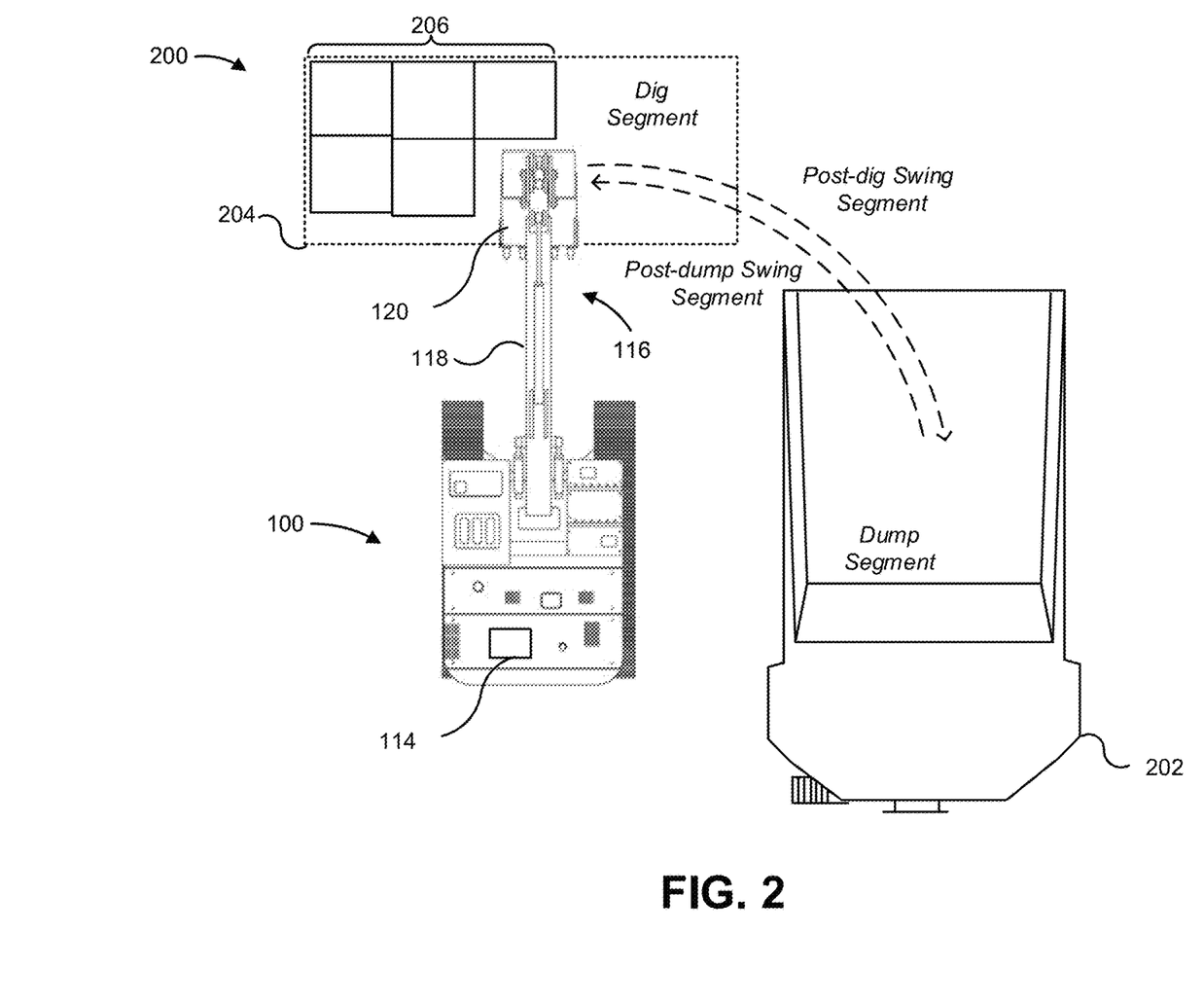
FIGS. 2-4 are diagrams of one or more example implementations described herein.

FIG. 2 is a diagram of an example implementation 200 described herein. Example implementation 200 illustrates a work cycle associated with an example worksite operation (e.g., a mining operation, a construction operation, an excavation operation, and/or the like) that involves a plurality of cycle segments. A cycle segment may include one or more processes or actions (e.g., corresponding to certain machine movement or control, certain implement movement or control, and/or the like) performed during an operation.

As described herein, the ECM 114 may determine the cycle segment based on information associated with the machine 100 (e.g., information received from operator interface 112, one or more sensors of the machine 100, and/or the like). In example implementation 200, the worksite operation involves the machine 100 loading a haul truck 202 (e.g., a bed of the haul truck 202) with material (e.g., ground material) from a dig site 204. In FIG. 2, the dig site 204 may include unprocessed areas 206 (shown as solid lines within the dig site 204) that include material that has not been processed by the machine 100 (e.g., ground material that has not been dug and/or loaded into the haul truck 202).

As described herein, the machine 100 and/or the implement 116 may be controlled by an operator (e.g., via an operator interface 112) and/or the ECM 114 (e.g., in autonomous and/or semi-autonomous applications). Further, the ECM 114 may control the LIDAR sensor 126 to monitor the worksite operation based on identifying, in real-time, a cycle segment of the work cycle and configuring, according to the cycle segment, a scan area of the LIDAR sensor 126 in order to obtain LIDAR data associated with one or more objects within the scan area.

In FIG. 2, during a dig segment of the work cycle, the machine 100 performs a dig operation at the dig site 204 to acquire material. During the dig operation, the implement 116 is controlled to cause the bucket 120 to penetrate the ground material with the bucket teeth 122 and scoop and/or lift the bucket 120 (e.g., move the bucket to a closed position and lift the bucket 120 from the surface of the ground where the ground material is located) to acquire the ground material.

The ECM 114 may identify that the machine 100 is operating in the dig segment of the work cycle based on one or more inputs from the operator interface 112 indicating that the implement 116 is being controlled for digging the ground material (e.g., inputs that indicate position settings of the boom 118 and/or bucket 120). Additionally, or alternatively, the ECM 114 may identify the machine 100 is operating in the dig segment based on one or more measurements from the operation sensor system 132 indicating a position of the bucket 120 relative to the boom 118 and/or a position of the boom 118 relative to the body 102 (e.g., a position corresponding to a closed or holding position of the bucket 120), a pressure associated with the implement 116 corresponding to a dig operation (e.g., an increase in pressure associated with penetrating the ground, an increase in pressure caused by lifting the ground material from the dig site 204, and/or the like), and/or the like. In this way, the ECM 114 may detect the dig operation and/or monitor the machine 100 during the dig segment of the work cycle.

During a post-dig swing segment of the work cycle, the machine 100 performs a swing operation to swing the bucket 120 over to the haul truck 202. During the swing operation, the body 102 of the machine 100 is controlled to rotate, relative to the support structure 104. The swing operation may include a traction system 108 being controlled to move the machine 100 in position to load haul truck 202.

The ECM 114 may identify the machine 100 is operating in the post-dig swing segment based on one or more inputs of the operator interface 112 indicating the implement 116 performed the dig operation (e.g., within a recent threshold period of time) and/or that the body 102 of the machine 100 is being controlled to rotate relative to the support structure 104 (e.g., to swing the bucket 120 and acquired ground material over the haul truck 202). Additionally, or alternatively, the ECM 114 may identify the machine 100 is operating in the post-dig swing segment based on one or more measurements from the operation sensor system 132 indicating movement of the machine 100 and/or movement of the body 102 relative to the support structure 104, a pressure associated with the implement 116 corresponding to a swing operation (e.g., an increase in an inertial pressure associated with rotating the body 102), a pressure associated with the bucket 120 including ground material (e.g., an increase in pressure associated with the implement 116 that is caused by the bucket 120 acquiring a mass associated with the quantity of ground material in the bucket 120), and/or the like. In this way, the ECM 114 may detect the post-dig swing operation and/or monitor the machine 100 during the post-dig swing segment of the work cycle.

During a dump segment of the work cycle, the machine 100 performs a dump operation to load the ground material from the bucket 120 into the haul truck 202 (e.g., into the bed of the haul truck 202). During the dump operation, the implement 116 is controlled to open the bucket 120 (e.g., move the bucket 120 to an open position) to release and/or remove the ground material from the bucket 120, and performing a dump operation associated with a haul truck 202.

The ECM 114 may identify the machine 100 is operating in the dump segment of the work cycle based on one or more inputs from the operator interface 112 indicating the implement 116 is being controlled for dumping the ground material (e.g., inputs that indicate position settings of the boom 118 and/or bucket 120). Additionally, or alternatively, the ECM 114 may identify the machine 100 is operating in the dump segment based on one or more measurements from the operation sensor system 132 indicating a position of the bucket 120 relative to the boom 118 and/or a position of the boom 118 relative to the body 102 (e.g., a position corresponding to an open or release position of the bucket 120), a pressure associated with the implement 116 corresponding to a dump operation (e.g., a decrease in pressure on the implement 116 caused by unloading the ground material from the bucket 120, and/or the like), and/or the like. In this way, the ECM 114 may detect the dig operation and/or monitor the machine 100 during the dig segment of the work cycle.

During a post-dump swing segment of the work cycle, the machine 100 performs a swing operation to swing the bucket 120 back to the dig site 204. During the swing operation, the body 102 of the machine 100 is controlled to rotate, relative to the support structure 104 and/or the traction system 108 is controlled to move the machine 100 in position to dig at the dig site 204.

The ECM 114 may identify the machine 100 is operating in the post-dump swing segment based on one or more inputs of the operator interface 112 indicating that the implement 116 performed the dump operation (e.g., within a recent threshold period of time) and/or that the body 102 of the machine 100 is being controlled to rotate relative to the support structure 104 (e.g., to return the bucket 120 to the dig site 204). Additionally, or alternatively, the ECM 114 may identify the machine 100 is operating in the post-dig swing segment based on one or more measurements from the operation sensor system 132 indicating movement of the machine 100 and/or movement of the body 102 relative to the support structure 104, a pressure associated with the implement 116 corresponding to a swing operation (e.g., an increase in an inertial pressure associated with rotating the body 102), a pressure associated with the bucket 120 not including ground material, and/or the like. In this way, the ECM 114 may detect the post-dig swing operation and/or monitor the machine 100 during the post-dig swing segment of the work cycle.

Accordingly, as described herein, the ECM 114 may determine a cycle segment of an operation of the machine 100. The above described example work cycle may include additional cycle segments (e.g., a pre-dig segment between the dig segment and the post-dig swing segment, a pre-dump segment between the post-dig swing segment and the dump segment, and/or the like), other cycle segments, and/or the like. In some implementations, during a cycle segment that involves movement of the machine 100 (e.g., a cycle segment involving a travel operation between the dig site 204 and an unload site or a machine storage location, a haul operation involving transport of ground material, a towing operation, and/or the like), the LIDAR sensor 126 may be configured, as described herein, to monitor for obstructions and/or objects within a scan area of the LIDAR sensor that includes a route of the machine 100. The LIDAR sensor 126 may similarly be configured to monitor for obstructions and/or objects within one or more of the cycle segments described above (e.g., to detect an obstruction in the unprocessed areas 206, to detect the bed of the haul truck 202 and/or an obstruction in the bed of the haul truck, to detect available space in the bed of the haul truck 202, and/or the like).

Furthermore, methods and/or systems described herein may correspondingly apply to other types of worksite operations and/or in connection with other types of machine operations and/or other types of machines. For example, a work cycle for the haul truck 202 may include a load segment for receiving the ground material at a load site (e.g., an area near the machine 100 and/or the dig site 204), a haul segment to haul the ground material to an unload site, an unload segment to unload the material at the unload site, and a return segment to return to the load site. Additionally, or alternatively, the methods and/or systems described herein may correspondingly apply to other materials and/or items other than ground material. For example, operations and/or cycle segments may correspondingly apply to a machine processing and/or transferring inventory, equipment, and/or the like.

As indicated above, FIG. 2 is provided as an example. Other examples may differ from what was described in connection with FIG. 2.

Figure 3:
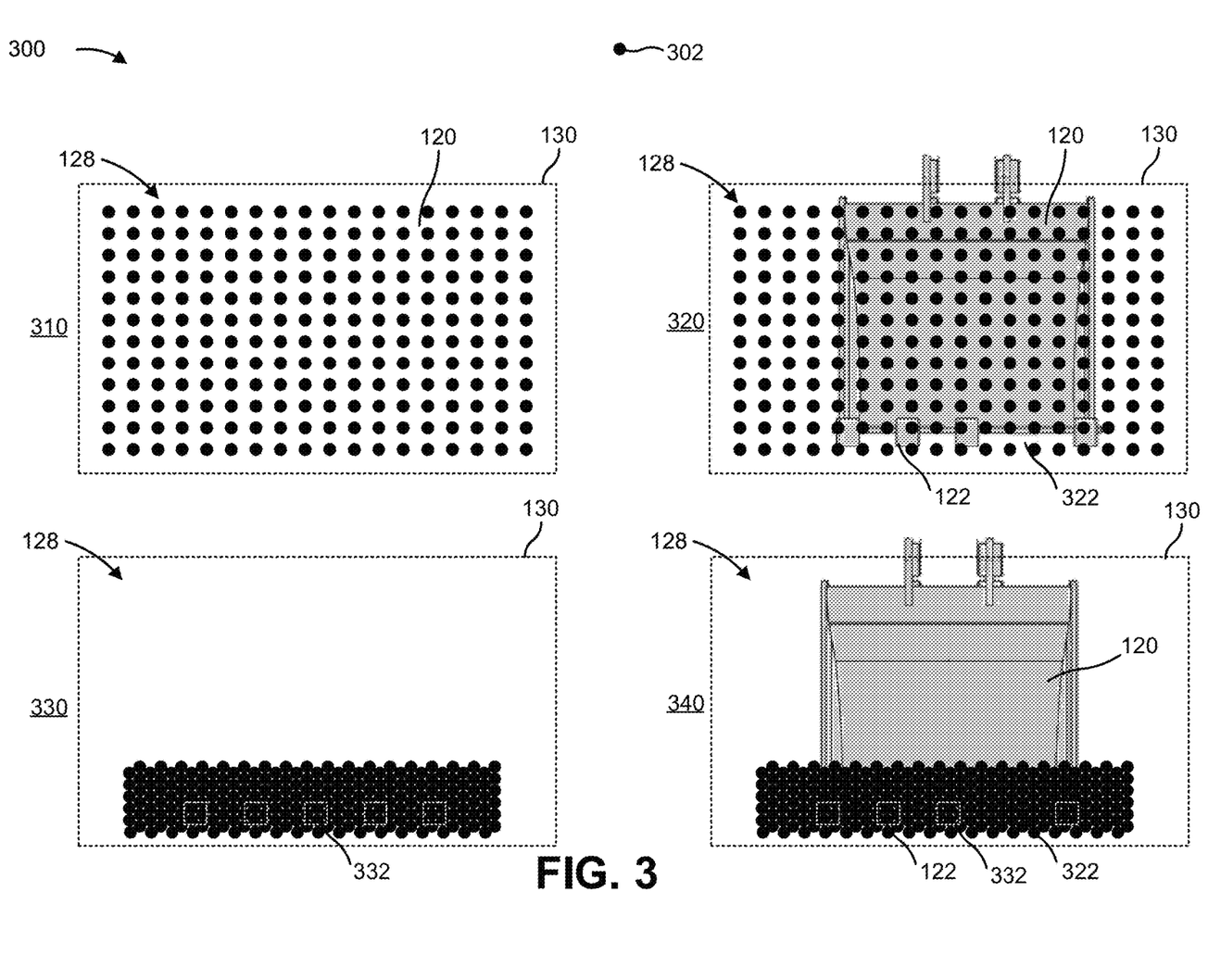

FIG. 3 is a diagram of an example implementation 300 described herein. Example implementation 300 illustrates an example of an ECM 114 configuring a scan area of the LIDAR sensor 126 to have an increased point density during a particular cycle segment of a work cycle. The increased point density, as shown in FIG. 3, is achieved by focusing or distributing LIDAR points 302 within an area of the field of view 128 that is smaller than a total area of the field of view 128 within perimeter 130. The LIDAR points 302 may correspond to a maximum amount of illumination points within the field of view 128 during a scan of the LIDAR sensor 126. The increased point density is relative to other portions of the field of view 128 of LIDAR sensor 126, such as areas of the field of view 128 that do not include an object of interest associated with the cycle segment.

The ECM 114, according to example implementation 300, configures the scan area of the LIDAR sensor 126 to analyze a wear status of the bucket teeth 122 and/or detect whether one of the bucket teeth 122 has broken away from the bucket 120 (e.g., during the worksite operation of FIG. 2). As shown in frame 310 of FIG. 3, the LIDAR points 302 may be equally distributed throughout the field of view 128 within the perimeter 130 (e.g., to identify an object of interest). Such equal distribution of the LIDAR points 302 provides a minimum point density of the LIDAR points 302 throughout the field of view 128 (e.g., because the quantity of LIDAR points 302 illustrated is a maximum quantity of LIDAR points for a scan of the LIDAR sensor 126). The ECM 114 may process the LIDAR data from the LIDAR points 302 in frame 310 and determine that there is no object within the field of view of the LIDAR sensor 126 (and may perform a corresponding action).

As shown in frame 320, a bucket 120 is positioned within the field of view 128 (e.g., within the perimeter 130). For example, the bucket 120 may be positioned within the field of view 128 during one or more of the cycle segments of FIG. 2. As shown in FIG. 2, the bucket has a broken bucket tooth 322 (e.g., a bucket tooth 122 that has worn down beyond a threshold and/or a bucket tooth 122 that has broken away from the bucket 120). In frame 320, similar to frame 310, the LIDAR points 302 are shown with a minimum point density throughout the field of view 128 of the LIDAR sensor 126 (due to the equal distribution of the LIDAR points 302). As described herein, the ECM 114 may determine that the bucket 120 (and/or bucket teeth 122) are within the field of view 128 based on a cycle segment associated with the machine 100.

To improve a degree of accuracy associated with detecting and/or analyzing the bucket teeth 122, the ECM 114, may determine a bucket tooth analysis point mapping as shown in frame 330. The bucket tooth analysis point mapping of frame 330 may indicate coordinates for the LIDAR points 302 (e.g., within a scan area for a LIDAR scan) to analyze the bucket teeth 122 and/or detect the broken bucket tooth 322. The bucket tooth analysis point mapping may indicate coordinates of a scan area of the field of view 128 corresponding to a reference position 332 of the bucket teeth 122 (e.g., shown as a position of the center tooth of the bucket teeth 122). The coordinates may correspond to coordinates of the field of view 128 and/or may be determined and/or mapped according to information associated with the cycle segment of the machine 100 (e.g., based on an operator interface 112, information from operation sensor system 132, and/or the like).

As shown in frame 340, the ECM 114 causes the LIDAR sensor 126 to capture LIDAR data, via a LIDAR scan, using the bucket tooth analysis point mapping so as to configure the scan area of the scan to increase the point density on the bucket teeth 122 (e.g., to increase a quantity of illuminating points on surfaces of the bucket teeth 122). To detect the broken bucket tooth 322, the ECM 114 may compare the captured LIDAR data with the increased point density to corresponding reference LIDAR data for a bucket that has a healthy or non-worn set of bucket teeth. Accordingly, due to the reference LIDAR data being different from the captured LIDAR data from frame 340, the ECM 114 may detect the broken bucket tooth 322. Further, as shown relative to a comparison of frame 320 with frame 340, the increased point density of frame 340 enables an increased quantity of LIDAR points 302 to illuminate and/or reflect from the surface of the bucket teeth 122, thus enabling the LIDAR sensor 126 to capture LIDAR data that enables the ECM 114 to more accurately analyze the wear status of the bucket teeth 122.

As described herein, the ECM 114 may configure the scan area of the LIDAR sensor 126 to include an increased point density in an area of the bucket teeth 122 of the bucket 120 during a particular cycle segment of a work cycle that provides an optimal view of the bucket teeth 122 (relative to the other cycle segments of the work cycle). For example, during the work cycle of FIG. 2, the ECM 114 may configure the scan area to have an increased point density as shown after the dump segment, during the post-dig swing segment, and/or before the dig segment of FIG. 2 (e.g., because the bucket 120 is most likely to be within the field of view 128 and not be obstructed by ground material in the bucket 120 or other obstructions during those cycle segments and/or time periods of the work cycle).

As indicated above, FIG. 3 is provided as an example. Other examples may differ from what was described in connection with FIG. 3.

Figure 4:
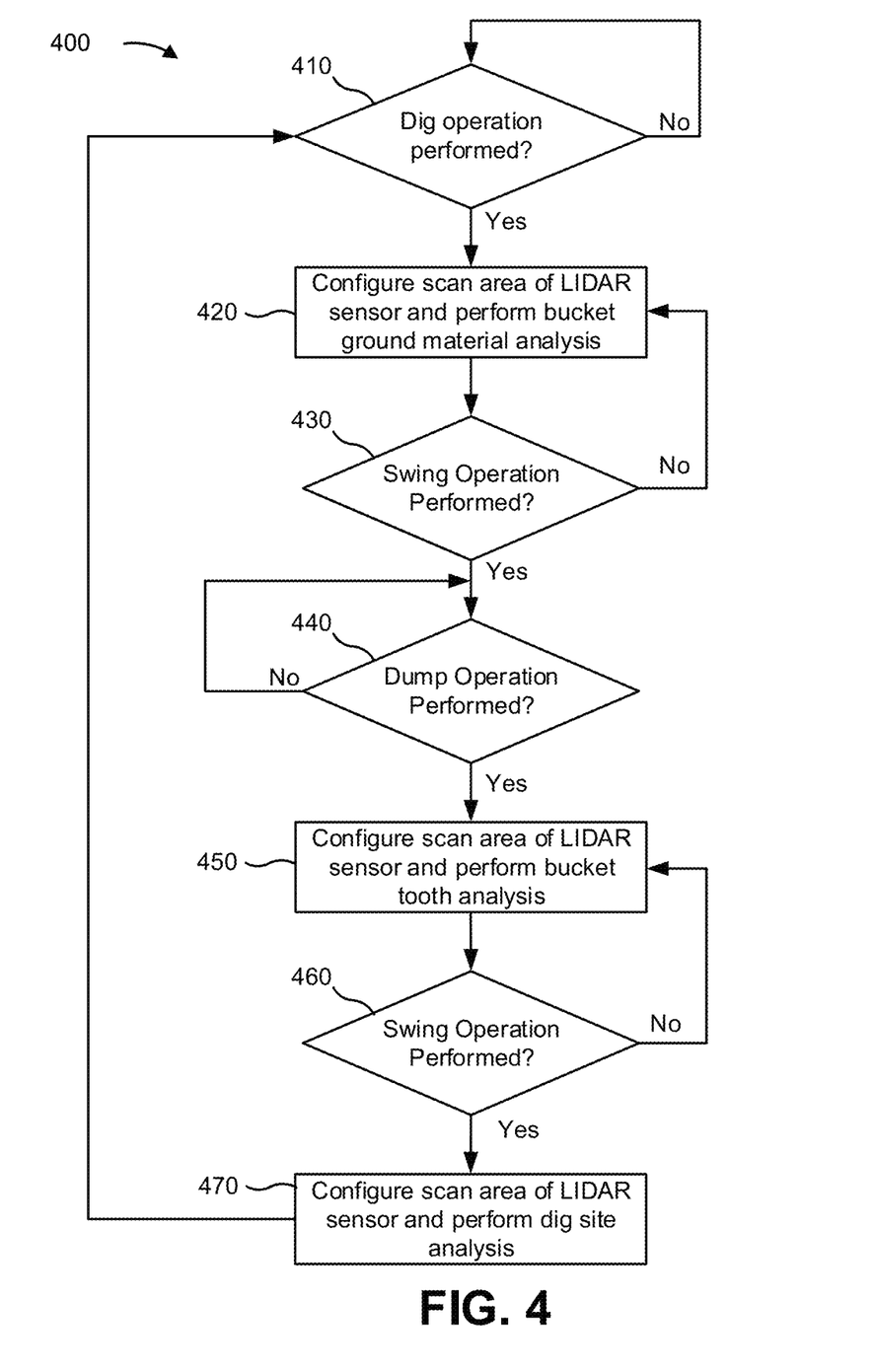

FIG. 4 is a flowchart illustrating the steps involved in an example implementation of the disclosed invention. The example implementation of FIG. 4 includes an iterative process 400 that may be performed by the ECM 114 to control the LIDAR sensor 126, as described herein. At block 410, the ECM 114 determines whether a dig operation has been performed. For example, the ECM 114 may monitor one or more inputs and/or operating parameters of the machine 100 to detect the dig operation. If a dig operation has not been performed, the ECM 114 may iteratively monitor the machine 100 (e.g., monitor information from the operator interface 112 and/or the operation sensor system 132) and/or wait to receive an indication that a dig operation has been performed.

When the ECM 114 detects that the dig operation has been performed (e.g., during the dig segment of FIG. 2), at block 420, the ECM 114 configures a scan area of the LIDAR sensor 126 and performs a bucket ground material analysis. For example, the ECM 114 may increase a point density of LIDAR sensor 126 within an area of the field of view 128 that includes the bucket 120 (e.g., a cavity of the bucket and/or the ground material within the bucket 120) to provide an increased quantity of LIDAR data (e.g., from an increased quantity of LIDAR points being focused on the bucket 120) that is associated with the bucket 120 and/or representative of the amount of ground material in the bucket 120. The ECM 114 may analyze the LIDAR data (e.g., using a LIDAR object detection model, a LIDAR spatial analysis model, and/or the like) to determine an amount of ground material that is in the bucket 120 (e.g., to measure or score a performance of the dig operation).

After performing the bucket ground material analysis, at block 430, the ECM 114 determines whether a swing operation has been performed. For example, the ECM 114 may monitor one or more inputs and/or operating parameters of the machine 100 to detect the swing operation. If a swing operation has not been performed, the ECM 114 may iteratively configure the scan area of the LIDAR sensor 126 and/or perform the bucket ground material analysis until the ECM 114 determines that a swing operation has been performed (e.g., to determine whether any ground material has been lost).

In the example of FIG. 4, when the ECM 114 detects that the swing operation has been performed (e.g., during the post-dig swing segment of FIG. 2), at block 440, the ECM 114 may determine whether a dump operation has been performed. For example, the ECM 114 may monitor one or more inputs and/or operating parameters of the machine 100 to detect the dump operation. If a dump operation has not been performed, the ECM 114 may iteratively monitor the machine 100 (e.g., monitor information from the operator interface 112 and/or the operation sensor system 132) and/or wait to receive an indication that a dump operation has been performed.

When the ECM 114 detects that the dump operation has been performed (e.g., during the dump segment of FIG. 2), at block 450, the ECM configures a scan area of the LIDAR sensor 126 and performs a bucket tooth analysis (e.g., similar to the analysis described in connection with FIG. 3). For example, the ECM 114 may increase a point density of LIDAR sensor 126 within an area of the field of view 128 that includes the bucket teeth 122 to provide an increased quantity of LIDAR data (e.g., from an increased quantity of LIDAR points being focused on the bucket 120) that is associated with the bucket teeth 122 and/or representative of the bucket teeth 122. The ECM 114 may analyze the LIDAR data to determine a wear status of the bucket teeth 122 (e.g., to determine whether any of the bucket teeth 122 require maintenance and/or need to be replaced).

After performing the bucket tooth analysis, at block 460, the ECM 114 determines whether a swing operation has been performed. For example, the ECM 114 may monitor one or more inputs and/or operating parameters of the machine 100 to detect the swing operation. If a swing operation has not been performed, the ECM 114 may iteratively configure the scan area of the LIDAR sensor 126 and/or perform the bucket ground material analysis until the ECM 114 determines that a swing operation has been performed (e.g., to determine whether any ground material has been lost).

In FIG. 4, when the ECM 114 detects that the swing operation has been performed (e.g., during the post-dig swing segment of FIG. 2), at block 470, the ECM 114 configures a scan area of the LIDAR sensor 126 and performs a dig site analysis. For example, the ECM 114 may increase a point density of LIDAR sensor 126 within an area of the field of view 128 that includes the dig site 204 to provide an increased quantity of LIDAR data (e.g., from an increased quantity of LIDAR points being focused on the dig site 204) that is associated with the dig site 204 and/or an unprocessed area 206 of the dig site 204. The ECM 114 may analyze the LIDAR data to determine an amount of ground material that is remaining at the dig site 204 and/or within the unprocessed area 206 (e.g., to determine a status of the worksite operation). After performing the dig site analysis, the ECM 114 may monitor for the next dig operation at block 410.

As indicated above, FIG. 4 is provided as an example. Other examples may differ from what was described in connection with FIG. 4.

Figure 5:
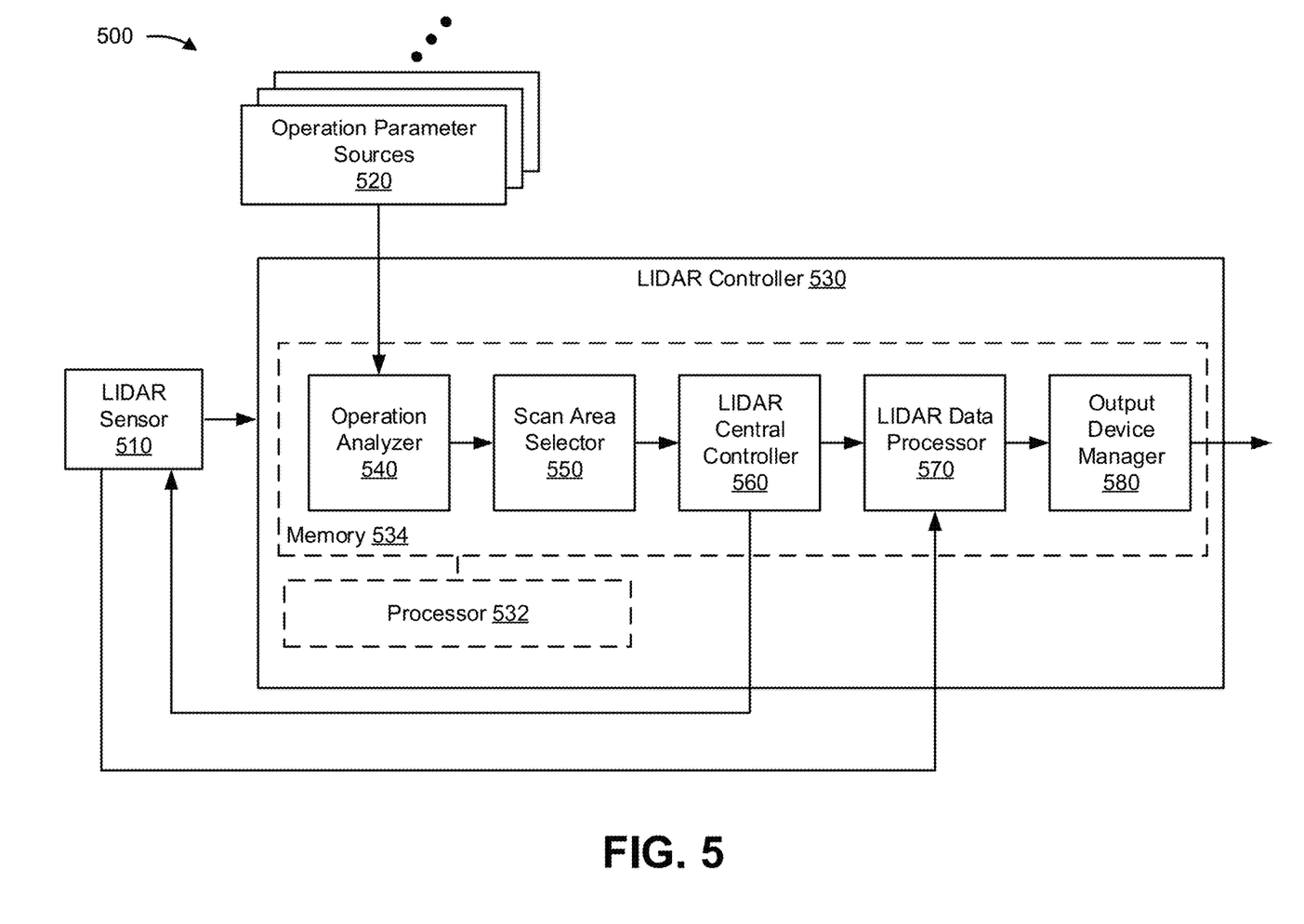
FIG. 5 is a diagram of an example system, described herein, that may be implemented in association with the machine of FIG. 1.

FIG. 5 is a diagram of an example system 500, described herein, that may be implemented in association with the machine 100 of FIG. 1. The system 500 of FIG. 5 includes a LIDAR sensor 510 (e.g., corresponding to the LIDAR sensor 126 of FIG. 1), one or more operation parameter sources 520 (referred to herein individually as "operation parameter source 520", and collectively as "operation parameter sources 520"), and a LIDAR controller 530 that includes a processor 532 and memory 534. As shown, the LIDAR controller 530 includes an operation analyzer 540, a scan area selector 550, a central controller 560, a LIDAR data processor 570, and an output device manager 580.

The LIDAR sensor 510 may include one or more devices, components, and/or elements that are capable of receiving, generating, storing, processing, and/or providing information associated with LIDAR, as described herein. For example, LIDAR sensor 510 may include a light emitter to emit light toward illumination points (which may be referred to herein as LIDAR points) within a field of view of the LIDAR sensor 510, an array of sensing elements to sense reflected light from the illumination points, and a signal processor to generate LIDAR data associated with the emitted light and sensed reflected light. The LIDAR data may be representative of an image of the field of view, a shape of an object detected within the field of view, and/or the like.

The LIDAR sensor 510 may be a fixed LIDAR sensor that is mounted to the machine 100 (and/or the implement 116) in a fixed position (e.g., such that movement of the machine 100 corresponds to movement of the LIDAR sensor 510). The LIDAR sensor 510 may be mounted to the machine 100 so that, based on a cycle segment of the machine 100, at least a portion of the implement 116 (e.g., the bucket 120 or a portion of the bucket 120) of the machine is within the field of view of the LIDAR sensor 510. A resolution of the LIDAR sensor 510 may be based on a maximum quantity of illumination points of each scan. Further, as described herein, the LIDAR sensor 510 may be configured to adjust a point density within a scan area of the field of view based on instructions from the LIDAR controller 530.

The operation parameter sources 520 include one or more devices, components, and/or elements that are capable of generating, storing, processing, and/or providing information associated with an operating parameter and/or operating condition of the machine 100. For example, the operation parameter sources 520 may include one or more input components of the operator interface 112, one or more sensors of the operation sensor system 132, and/or the like. Accordingly, the operation parameter sources 520 may provide information associated with a cycle segment of the machine 100, such as information identifying a control setting associated with the implement 116, a position of the boom 118 and/or the bucket 120, a position of the body 102 and/or the support structure 104, a speed of the machine 100, a route of the machine 100 (e.g., based on a navigation input and/or navigation system), and/or the like.

The LIDAR controller 530 may be associated with, included within, and/or correspond to the ECM 114 of FIG.

1. Processor 532 is implemented in hardware, firmware, and/or a combination of hardware and software. Processor 532 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. Processor 532 includes one or more processors capable of being programmed to perform a function. Memory 534 includes a random-access memory (RAM), a read only memory (ROM), and/or another type of dynamic or static storage device (e.g., a flash memory, a magnetic memory, and/or an optical memory) that stores information and/or instructions for use by processor 532 (e.g., information and/or instructions associated with the operation analyzer 540, the scan area selector 550, the LIDAR central controller 560, the LIDAR data processor 570, the output device manager 580, and/or the like).

The operation analyzer 540 includes one or more components or devices configured to analyze an operation (e.g., an operation that includes a work cycle) associated with the machine 100. For example, the operation analyzer 540 may receive information from the operation parameter sources 520 and determine the cycle segment of the machine 100 based on the information. The information may include inputs from operator interface 112, including a control input to adjust a position of the implement 116, a control input to adjust an orientation of the machine 100 (e.g., an orientation corresponding to a position of the body 102 and the support structure 104), or a control input to move the machine 100 (e.g., via traction system 108). The cycle segment may be associated with a designated position of implement 116 and/or or a position of the machine 100 (referred to as a "machine position") relative to a worksite of the operation.

The scan area selector 550 includes one or more components or devices configured to determine a scan area within a field of view of the LIDAR sensor 510. The scan area may have an increased point density relative to another area of the field of view and/or a minimum point density corresponding to a maximum quantity of illuminating points being equally distributed throughout the field of view of the LIDAR sensor 510.

The scan area selector 550 may select and/or configure the scan area based on the determined cycle segment. For example, the scan area selector 550 may select, from a plurality of point mappings for corresponding cycle segments of operations of the machine, a point mapping for a scan area for that cycle segment to enable an object of interest associated with the cycle segment (e.g., the bucket 120, ground material in the bucket 120, the bucket teeth 122, ground material of the dig site 204, ground material remaining in the unprocessed area 206, and/or the like) to be analyzed with the increased point density.

The LIDAR central controller 560 includes one or more components or devices configured to cause the LIDAR sensor 510 to capture LIDAR data associated with the scan area. For example, the LIDAR central controller 560, via one or more instructions or commands, may provide the point mapping to cause the LIDAR sensor 510 to capture the LIDAR data according to the point mapping. Accordingly, the LIDAR central controller 560 may cause the LIDAR sensor 510 to capture relatively increased quantity of LIDAR data associated with an object of interest to be captured due to the increased point density of the scan area.

In some implementations, the increased point density may correspond to a point density that satisfies a threshold point density associated with identifying and/or analyzing an object of interest, as described herein. For example, a relative higher increased point density may be required to detect relatively smaller objects of interest (e.g., the bucket teeth 122), while a relatively lower point density can be used to detect relatively larger objects of interest (e.g., an amount of ground material at the dig site 204, an obstruction along a route path of the machine 100, and/or the like).

The LIDAR data processor 570 includes one or more components or devices configured to process the LIDAR data to determine a status of associated with the operation. The status may correspond to a status of the machine (e.g., a wear status of the bucket teeth 122) and/or a status of a worksite of the machine 100 (e.g., the dig site 204).

The LIDAR data processor 570 may use a LIDAR analysis model (e.g., an object detection model, an object analysis model, a spatial analysis model, and/or the like) to determine the status of the operation. In some implementations, the LIDAR analysis model is configured to identify a designated object associated with the operation that is specific to the cycle segment. For example, the LIDAR analysis model may correspond to an object detection model that is trained to identify the bucket teeth 122 and/or determine a wear status (e.g., based on a size and/or shape of the bucket teeth 122) of the bucket teeth 122 using reference information and/or data associated with a standard bucket tooth and/or previously analyzed bucket teeth associated with bucket teeth 122. The status may correspond to a production status associated with a worksite of the machine 100. For example, referring to the examples above, the production status may indicate a quantity of ground material that the machine 100 loaded into the haul truck 202 (e.g., total or work cycle), a quantity of work cycles performed during an operation, an amount of time associated with a work cycle, a quantity of ground material remaining at the dig site 204 (e.g., a quantity of ground material in the unprocessed areas 206), and/or the like.

The output device manager 580 includes one or more components or devices configured to perform an action associated with the machine 100 and/or the status of the machine 100. The output module may provide information associated with the status of the operation and/or the machine 100. For example, the output device manager 580 may indicate the wear status to an operator (e.g., via operator interface 112) to enable the operator to identify when a bucket tooth has worn beyond a threshold and/or is missing. The output device manager 580 may provide an alert to an operator when an obstruction is detected within a route path or dig site of the machine 100 (e.g., to enable the operator to avoid the obstruction). The output device manager 580 may provide the information to a backend monitoring system associated with the machine 100, as described herein.

The number and arrangement of modules and/or devices shown in FIG. 5 are provided as an example. In practice, there may be additional modules and/or devices, fewer modules and/or devices, different modules and/or devices, or differently arranged modules and/or devices than those shown in FIG. 5. Furthermore, two or more modules and/or devices shown in FIG. 5 may be implemented within a single module or device, or a single module or device shown in FIG. 5 may be implemented as multiple, distributed modules or devices. A set of modules or devices (e.g., one or more modules or devices) of system 500 may perform one or more functions described as being performed by another set of modules or devices of system 500.

Figure 6:
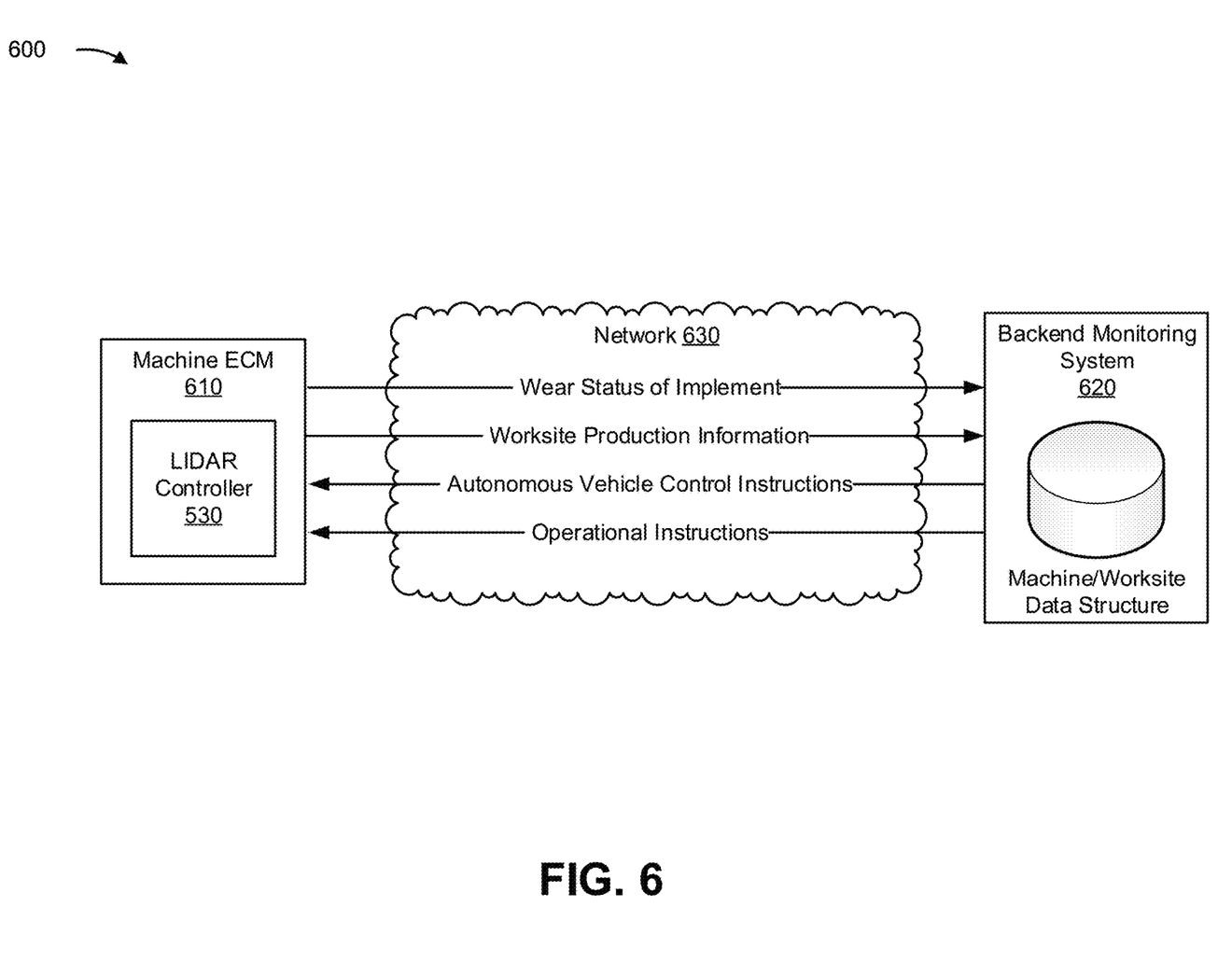
FIG. 6 is a diagram of an example environment in which systems and/or methods, described herein, may be implemented.

FIG. 6 is a diagram of an example environment 600 in which systems and/or methods, described herein, may be implemented. As shown in FIG. 6, environment 600 may include a machine ECM 610, a backend monitoring system 620, and a network 630. As shown, the machine ECM 610 (which may correspond to the ECM 114) may include a LIDAR controller 530 (e.g., corresponding to the LIDAR controller 530 of FIG. 5). The backend monitoring system 620 includes a machine/worksite data structure that may be used to maintain information associated with the machine 100 and/or a worksite of the machine 100 (e.g., the dig site 204). Devices of environment 600 may interconnect via wired connections, wireless connections, or a combination of wired and wireless connections.

The network 630 includes a wireless network that enables wireless communication between the machine ECM 610 and the backend monitoring system 620. For example, network 630 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The machine ECM 610 may provide a wear status of an implement monitored by the LIDAR controller 530. The machine ECM 610 may provide worksite production information associated with a worksite of the machine 100 (e.g., a production status, a performance status, and/or the like). For example, the machine ECM 610 may provide information identifying a quantity of processed material at the worksite during the operation, information identifying a quantity of remaining material to be processed at the worksite in association with the operation, performance information associated with the operation (e.g., production rate, ground material processed per work cycle, quantity of work cycles per operation, and/or the like), and/or the like.

The backend monitoring system 620 includes one or more devices, systems, and/or platforms that are configured to monitor the machine 100 according to information from the machine ECM 610. For example, the backend monitoring system may include a maintenance analysis and/or maintenance scheduling system configured to manage and/or maintain maintenance associated with the machine 100. More specifically, if the backend monitoring system 620 receives information that the bucket 120 has lost one of the bucket teeth 122, the backend monitoring system 620 may be configured to facilitate automated scheduling of maintenance on the machine to replace the missing bucket tooth 122, order a replacement bucket tooth 122, and/or instructing the machine 100 to navigate to a maintenance bay for the maintenance (e.g., if the machine 100 is an autonomously controlled machine).

The backend monitoring system 620 may include a production analysis system that is configured to track production information associated with operations of the machine 100 and/or a worksite of the machine 100. Accordingly, the backend monitoring system 620 may store and/or maintain productivity information associated with the operation and/ or the machine 100 for business analysis of the worksite, to troubleshoot production issues with the operation, the machine 100, and/or an operator of the machine, and/or the like.

In this way, the machine ECM 610 may facilitate remote monitoring of the machine 100, an operation of the machine 100, and/or a worksite associate with the machine.

The number and arrangement of devices and networks shown in FIG. 6 are provided as an example. In practice, there may be additional devices and/or networks, fewer devices and/or networks, different devices and/or networks, or differently arranged devices and/or networks than those shown in Fig. Env. Furthermore, two or more devices shown in Fig. Env may be implemented within a single device, or a single device shown in Fig. Env may be implemented as multiple, distributed devices. A set of devices (e.g., one or more devices) of environment 600 may perform one or more functions described as being performed by another set of devices of environment 600.

Figure 7:
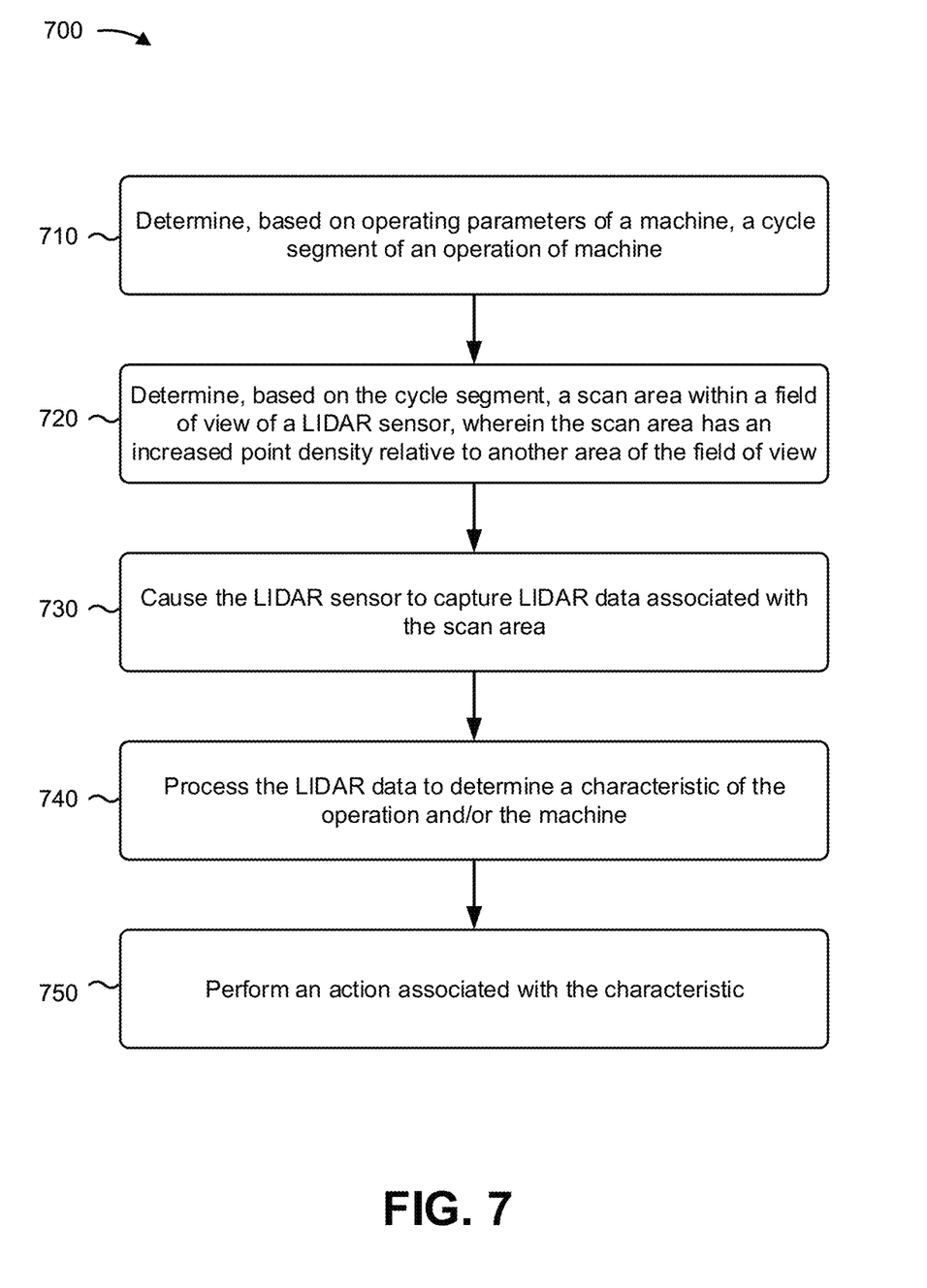
FIG. 7 is a flowchart of an example process associated with configuring a LIDAR sensor scan area according to a cycle segment of an operation of an operation of a machine, as described herein.

FIG. 7 is a flowchart of an example process associated with configuring a LIDAR sensor scan area according to a cycle segment of an operation of of a machine, as described herein. In some implementations, one or more process blocks of FIG. 7 may be performed by a LIDAR controller (e.g., LIDAR controller 530). In some implementations, one or more process blocks of FIG. 7 may be performed by another device or a group of devices separate from or including the LIDAR controller, such as an ECM (e.g., the ECM 114, the machine ECM 610), operation parameter sources (e.g., the operation parameter sources 520, the operator interface 112, the operation sensor system 132, and/or the like), and/or the like.

As shown in FIG. 7, process 700 may include receiving cycle segment information identifying a cycle segment of an operation of a machine (block 710). For example, the LIDAR controller (e.g., using the operation analyzer 540) may receive cycle segment information identifying a cycle segment of an operation of a machine, as described above.

As further shown in FIG. 7, process 700 may include determining, based on the cycle segment information, a scan area within a field of view of the LIDAR sensor (block 720). For example, the LIDAR controller (e.g., using the scan area selector 550) may determine, based on the cycle segment information, a scan area within a field of view of the LIDAR sensor, as described above. The scan area may be determined based on a point mapping in a data structure that maps a plurality of cycle segments of the operation to corresponding scan areas. The cycle segment may involve an implement of a machine being within the field of view.

As further shown in FIG. 7, process 700 may include causing the LIDAR sensor to capture, with an increased point density relative to a non-scan area within the field of view, LIDAR data associated with the scan area (block 730). For example, the LIDAR controller (e.g., using the LIDAR central controller 560) may cause the LIDAR sensor to capture, with an increased point density relative to a non-scan area within the field of view, LIDAR data associated with the scan area, as described above. The LIDAR controller may configure the LIDAR sensor to focus a fixed quantity of scan points of a scan of the LIDAR sensor to be focused within a perimeter of the scan area, and cause the LIDAR sensor to execute the scan to capture the LIDAR data.

The LIDAR controller may determine, based on the cycle segment information, a position of a ground engaging tool of the implement relative to the field of view. The LIDAR controller may redistribute a set of points, of a fixed quantity of points of the LIDAR sensor, to be within a threshold distance of the position of the ground engaging tool to generate the increased point density.

As further shown in FIG. 7, process 700 may include processing the LIDAR data to determine, using the increased point density, a status associated with the operation (block 740). For example, the LIDAR controller (e.g., using the LIDAR data processer 570) may process the LIDAR data to determine, using the increased point density, a status associated with the operation, as described above. The status associated with the operation may correspond to a wear status of the implement.

The LIDAR controller may identify, using an object detection model, an object of interest associated with the cycle segment and determine a characteristic of the object of interest. The status may be associated with the characteristic of the object of interest.

As further shown in FIG. 7, process 700 may include performing an action associated with indicating the status associated with the operation (block 750). For example, the LIDAR controller (e.g., using the output device manager 580) may perform an action associated with indicating the status associated with the operation, as described above. The LIDAR controller, when performing the action, may record the status in a log associated with monitoring the operation, provide the status to a backend monitoring system associated with monitoring the operation, or provide the status to an operator interface of the machine.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

INDUSTRIAL APPLICABILITY

A work cycle of an operation may include a variety of different cycle segments that are performed by a machine. Certain characteristics of the cycle segments cause certain cycle segments to be more conducive to monitoring certain aspects of the machine or the operation. For example, a cycle segment following a dump operation with the bucket 120 is more conducive to detect a wear status of the bucket teeth 122 than a cycle segment during or following a dig operation (e.g., because ground material may obstruct the view of the bucket teeth 122). As another example, a cycle segment following a dig operation with the bucket 120 is more conducive to determine an amount of ground material that is in the bucket 120 than a cycle segment before the dig operation (e.g., because the bucket 120 does not include any ground material).

According to some implementations described herein, the LIDAR controller 530 and/or the ECM 114 may utilize LIDAR sensor 126 to analyze a characteristic of an operation, of the machine 100, and/or of the worksite of the machine 100 based on the cycle segment of the operation. For example, as described herein, the LIDAR controller 530 may identify a cycle segment of the machine 100 (e.g., based on operator inputs, based on sensor measurements, and/or the like), and determine a scan area of the field of view 124 to determine the characteristic. In this way, the LIDAR controller 530 may conserve resources (e.g., processing resources, memory resources, and/or the like) associated with the LIDAR sensor 126 continuously capturing and providing LIDAR data during cycle segments that are not conducive to determining a desired status and/or are ineffective in determining a desired status due to the current cycle status.

Furthermore, the LIDAR controller 530 may control the LIDAR sensor 126 to increase a point density of a scan area of an object of interest according to the cycle segment of the operation. In this way, the LIDAR controller 530 increases a probability that more LIDAR data associated with the object of interest can be obtained to identify the object of interest associated with the cycle segment. Therefore, the LIDAR controller 530 improves a level of accuracy associated with determining the characteristics and/or a status of the operation, the machine 100, and/or the worksite based on the analysis of the objects of interest. Correspondingly, the LIDAR controller 530 may permit more accurate and quicker detection of a degraded status of the machine 100. For example, the LIDAR controller 530, as described herein, provides more accurate and relatively faster detection of a missing bucket tooth 122, thus preventing further damage to the bucket 120, the implement 116, and/or the machine 100, and correspondingly prolonging the useful life of the bucket 120, the implement 116, and the machine 100.

As described herein, a LIDAR sensor may be mounted in a fixed location of the machine, and correspondingly, may have a fixed field of view. Therefore, relative to techniques that involve a LIDAR sensor mounted to independently controlled mechanical device configured to adjust the field of view, the examples described herein permit relatively simplistic mounting and control of the LIDAR sensor, thus reducing hardware resources, cost, and design complexity (e.g., by eliminating a need to develop controls for the mechanical device to operate in association with the LIDAR sensor), and/or computing resources (e.g., processing resources and/or memory resources associated with adjusting position of the mechanical devices).

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations may be made in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

What is claimed is:

1. A method, comprising:
    receiving, by a device, an input associated with an operation of a machine;
    determining, by the device and based on the input, a cycle segment of the operation;
    determining, by the device and based on the cycle segment, a scan area within a field of view of a light detection and ranging (LIDAR) sensor mounted to the machine,
        wherein the scan area has an increased point density relative to another area of the field of view;
    causing, by the device, the LIDAR sensor to capture, with the increased point density, LIDAR data associated with the scan area;
    processing, by the device, the LIDAR data to determine, using the increased point density, a status associated with the operation; and performing, by the device, an action associated with indicating the status associated with the operation.

2. The method of claim 1, wherein the cycle segment is associated with at least one of:
a designated position of an implement of the machine, or
a machine position relative to a worksite,
wherein the scan area is configured to cause the LIDAR data to be associated with the implement or the worksite.

3. The method of claim 1, wherein the input is associated with at least one of:
a control input to adjust a position of an implement of the machine,
a control input to adjust an orientation of the machine, or
a control input to move the machine.

4. The method of claim 1, further comprising:
receiving information associated with a position of an implement of the machine,
wherein determining the cycle segment comprises:
determining the cycle segment based on the input and the information.

5. The method of claim 1, wherein processing the LIDAR data comprises:
processing the LIDAR data to determine the status associated with the operation according to a specific cycle segment of the operation.

6. The method of claim 1, wherein the status associated with the operation indicates at least one of:
a wear status of an implement of the machine during the operation, or
a production status of a worksite of the operation.

7. The method of claim 1, wherein the scan area is associated with a portion of the field of view that includes a wear element of an implement of the machine, and
wherein performing the action comprises at least one of:
providing an alert to an operator interface of the machine to indicate a wear status of the wear element, or
providing an alert to a backend monitoring system to indicate a wear status of the wear element.

8. The method of claim 1, wherein the scan area is associated with ground material at a worksite of the operation, and
wherein performing the action comprises at least one of:
providing information identifying a quantity of processed material at the worksite during the operation, or
providing information identifying a quantity of remaining material to be processed at the worksite in association with the operation.

9. A device, comprising:
one or more memories; and
one or more processors, communicatively coupled to the one or more memories, configured to:
determine, based on operating parameters of a machine, a cycle segment of an operation of the machine;
determine, based on the cycle segment, a scan area within a field of view of a light detection and ranging (LIDAR) sensor associated with the machine,
wherein the scan area has an increased point density relative to another area of the field of view;
cause the LIDAR sensor to capture, with the increased point density, LIDAR data associated with the scan area;
process the LIDAR data to determine, using the increased point density and an object detection model, a status associated with the operation; and
perform an action associated with indicating the status associated with the operation.

10. The device of claim 9, wherein the operating parameters include at least one of:
a position of an implement of the machine,
an input associated with controlling an implement of the machine, or
an input associated with controlling movement of the machine.

11. The device of claim 9, wherein the LIDAR sensor is mounted to the machine in a fixed position that enables, based on the cycle segment, at least a portion of an implement of the machine to be within the field of view.

12. The device of claim 9, wherein the object detection model is configured to identify a designated object associated with the operation that is specific to the cycle segment.

13. The device of claim 12, wherein the increased point density satisfies a threshold point density associated with the object detection model being able to identify the designated object.

14. The device of claim 9, wherein the one or more processors, when performing the action, are configured to at least one of:
provide an alert to an operator interface of the machine to indicate a wear status of an implement of the machine,
provide an alert to a backend monitoring system to indicate the wear status, or
provide performance information associated with the operation.

15. A system comprising:
a light detection and ranging (LIDAR) sensor; and
a controller configured to:
receive cycle segment information identifying a cycle segment of an operation of a machine;
determine, based on the cycle segment information, a scan area within a field of view of the LIDAR sensor;
cause the LIDAR sensor to capture, with an increased point density relative to a non-scan area within the field of view, LIDAR data associated with the scan area;
process the LIDAR data to determine, using the increased point density, a status associated with the operation; and
perform an action associated with indicating the status associated with the operation.

16. The system of claim 15, wherein the scan area is determined based on a point mapping in a data structure that maps a plurality of cycle segments of the operation to corresponding scan areas.

17. The system of claim 15, wherein the controller, when causing the LIDAR sensor to capture the LIDAR data, is configured to:
configure the LIDAR sensor to focus a fixed quantity of LIDAR points of a scan of the LIDAR sensor to be focused within a perimeter of the scan area; and
cause the LIDAR sensor to execute the scan to capture the LIDAR data.

18. The system of claim 15, wherein the cycle segment involves an implement of a machine being within the field of view,
wherein the status associated with the operation corresponds to a wear status of the implement, and
wherein the controller is configured to:
determine, based on the cycle segment information, a position of a ground engaging tool of the implement relative to the field of view; and redistribute a set of points, of a fixed quantity of points of the LIDAR sensor, to be within a threshold distance of the position of the ground engaging tool to generate the increased point density.

19. The system of claim 15, wherein the controller, when processing the LIDAR data, is configured to:
   identify, using an object detection model, an object of interest associated with the cycle segment; and
   determine a characteristic of the object of interest, wherein the status is associated with the characteristic of the object of interest.

20. The system of claim 15, wherein the controller, when performing the action, is configured to at least one of:
   record the status in a log associated with monitoring the operation,
   provide the status to a backend monitoring system associated with monitoring the operation, or
   provide the status to an operator interface of the machine.

* * * * *